US012641334B2

(12) United States Patent  (10) Patent No.:  US 12,641,334 B2

Weissenberger et al.  (45) **Date of Patent:  *May 26, 2026**

(54) CONDITIONAL CAMERA CONTROL VIA AUTOMATED ASSISTANT COMMANDS

(71) Applicant: GOOGLE LLC, Mountain View, CA (US)

(72) Inventors: Felix Weissenberger, Zurich (CH); Balint Miklos, Zurich (CH); Victor Carbune, Zurich (CH); Matthew Sharifi, Kilchberg (CH); Domenico Carbotta, Zurich (CH); Ray Chen, Altendorf (CH); Kevin Fu, Taipei (TW); Bogdan Prisacari, Adliswil (CH); Fo Lee, Taipei (TW); Mucun Lu, Taipei (TW); Neha Garg, Palo Alto, CA (US); Jacopo Sannazzaro Natta, Berkeley, CA (US); Barbara Poblocka, Zurich (CH); Jae Seo, Palo Alto, CA (US); Matthew Miao, San Jose, CA (US); Thomas Qian, Santa Clara, CA (US); Luv Kothari, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 18/784,226

(22) Filed: Jul. 25, 2024

(65) Prior Publication Data

US 2024/0380970 A1     Nov. 14, 2024

Related U.S. Application Data

(63) Continuation of application No. 18/446,381, filed on Aug. 8, 2023, now Pat. No. 12,052,492, which is a (Continued)

(51) Int. Cl.
| | | |
|---|---|---|
| *H04N 23/60* | (2023.01) | |
| *G06N 20/00* | (2019.01) | |

(Continued)

(52) U.S. Cl.
CPC ............. *H04N 23/64* (2023.01); *G06N 20/00* (2019.01); *G10L 15/22* (2013.01); *G10L 25/51* (2013.01);

(Continued)

(58) Field of Classification Search
CPC ............. H04N 5/2628; H04N 5/23219; H04N 5/23222; H04N 5/23218; H04N 5/23203;

(Continued)

(56) References Cited

U.S. PATENT DOCUMENTS

| | | |
|---|---|---|
| 8,023,751 B1 | 9/2011 | Reisman |
| 8,731,613 B2 | 5/2014 | Tanabe |

(Continued)

FOREIGN PATENT DOCUMENTS

| | | |
|---|---|---|
| CN | 104967777 | 10/2015 |
| CN | 108093167 | 5/2018 |

(Continued)

OTHER PUBLICATIONS

Korean Patent Office; Notice of Office Action issued in Application No. 10-2022-7042613; 20 pages; dated Dec. 20, 2024.

(Continued)

*Primary Examiner* — Pritham D Prabhakher

(74) *Attorney, Agent, or Firm* — Gray Ice Higdon

(57) ABSTRACT

Implementations set forth herein relate to an automated assistant that can control a camera according to one or more conditions specified by a user. A condition can be satisfied when, for example, the automated assistant detects a particular environment feature is apparent. In this way, the user can rely on the automated assistant to identify and capture (Continued)

certain moments without necessarily requiring the user to constantly monitor a viewing window of the camera. In some implementations, a condition for the automated assistant to capture media data can be based on application data and/or other contextual data that is associated with the automated assistant. For instance, a relationship between content in a camera viewing window and other content of an application interface can be a condition upon which the automated assistant captures certain media data using a camera.

18 Claims, 6 Drawing Sheets

Related U.S. Application Data continuation of application No. 18/097,150, filed on Jan. 13, 2023, now Pat. No. 11,765,452, which is a continuation of application No. 17/103,805, filed on Nov. 24, 2020, now Pat. No. 11,558,546.

(51) Int. Cl.

| | |
|---|---|
| *G10L 15/18* | (2013.01) |
| *G10L 15/22* | (2006.01) |
| *G10L 25/51* | (2013.01) |
| *H04N 5/92* | (2006.01) |
| *H04N 23/61* | (2023.01) |
| *H04N 23/62* | (2023.01) |
| *H04N 23/66* | (2023.01) |
| *H04N 23/95* | (2023.01) |

(52) U.S. Cl.
CPC ........... *H04N 5/9201* (2013.01); *H04N 23/61* (2023.01); *H04N 23/62* (2023.01); *H04N 23/66* (2023.01); *H04N 23/95* (2023.01); *G10L 15/1822* (2013.01); *G10L 2015/223* (2013.01)

(58) Field of Classification Search
CPC ........... H04N 5/23216; H04N 5/23229; H04N 5/9201; H04N 7/15; H04N 7/147; H04N 23/64; H04N 23/61; H04N 23/66; H04N 23/80; H04N 23/62; G06V 40/172; G06N 20/00; G10L 15/22; G10L 15/1822; G10L 25/51; G10L 2015/223
USPC ..................................................... 348/207.11
See application file for complete search history.

(56) References Cited

U.S. PATENT DOCUMENTS

| | | | | |
|---|---|---|---|---|
| 9,547,647 | B2 * | 1/2017 | Badaskar | ................. G10L 15/22 |
| 9,583,097 | B2 * | 2/2017 | Agrawal | ................. G10L 21/06 |
| 9,769,367 | B2 | 9/2017 | Rifkin | |
| 9,792,281 | B2 * | 10/2017 | Sarikaya | ................. G06F 40/40 |
| 9,912,715 | B2 * | 3/2018 | Xiao | ...................... H04L 67/303 |
| 9,922,648 | B2 | 3/2018 | Wang et al. | |
| 9,973,732 | B1 | 5/2018 | Goetz | |
| 10,049,670 | B2 | 8/2018 | Wang et al. | |
| 10,070,050 | B2 * | 9/2018 | De Bayser | ........... G06F 16/532 |
| 10,127,906 | B1 | 11/2018 | Mutagi | |
| 10,275,651 | B2 | 4/2019 | Badr et al. | |
| 10,360,910 | B2 | 7/2019 | Valentine | |
| 10,650,816 | B2 | 5/2020 | Lee | |
| 10,726,836 | B2 | 7/2020 | Baik | |
| 10,902,855 | B2 | 1/2021 | Min | |
| 11,119,725 | B2 | 9/2021 | White | |
| 11,169,772 | B2 | 11/2021 | Hansson | |
| 11,227,594 | B2 * | 1/2022 | Lee | ........................... G06F 3/16 |
| 11,231,826 | B2 | 1/2022 | Gelfenbeyn | |
| 11,240,560 | B2 | 2/2022 | Konzelmann et al. | |
| 11,269,804 | B1 * | 3/2022 | Domenico, III | ........ G06F 21/44 |
| 11,287,847 | B2 | 3/2022 | Ritchey | |
| 11,455,996 | B2 | 9/2022 | Carbune | |
| 11,488,597 | B2 | 11/2022 | Carbune | |
| 11,545,149 | B2 | 1/2023 | Jang | |
| 11,553,887 | B2 | 1/2023 | Mclaughlin | |
| 11,558,546 | B2 | 1/2023 | Weissenberger et al. | |
| 11,568,868 | B2 | 1/2023 | Gao | |
| 11,687,316 | B2 | 6/2023 | Noyes | |
| 11,688,417 | B2 | 6/2023 | Konzelmann | |
| 11,748,660 | B2 | 9/2023 | Sharifi | |
| 11,765,452 | B2 | 9/2023 | Weissenberger et al. | |
| 11,790,903 | B2 * | 10/2023 | Yu | ......................... G10L 15/197 |
| | | | | 704/275 |
| 11,922,934 | B2 | 3/2024 | Luan | |
| 2003/0117505 | A1 | 6/2003 | Sasaki et al. | |
| 2006/0093998 | A1 | 5/2006 | Vertegaal | |
| 2014/0347504 | A1 | 11/2014 | Konicek | |
| 2015/0116521 | A1 | 4/2015 | Tsai et al. | |
| 2015/0279369 | A1 | 10/2015 | Lee | |
| 2016/0014324 | A1 | 1/2016 | Fan et al. | |
| 2016/0070334 | A1 | 3/2016 | Frank et al. | |
| 2016/0259767 | A1 | 9/2016 | Gelfenbeyn et al. | |
| 2016/0277661 | A1 | 9/2016 | Brav et al. | |
| 2017/0041523 | A1 | 2/2017 | Rifkin | |
| 2017/0163866 | A1 * | 6/2017 | Johnson | .................. G06F 3/011 |
| 2017/0282373 | A1 * | 10/2017 | Kondo | .................... G10L 15/22 |
| 2017/0339340 | A1 * | 11/2017 | De Bayser | ............. G10L 15/22 |
| 2017/0352352 | A1 | 12/2017 | Wang et al. | |
| 2018/0007250 | A1 | 1/2018 | Rifkin et al. | |
| 2018/0047391 | A1 | 2/2018 | Baik | |
| 2018/0061409 | A1 | 3/2018 | Valentine | |
| 2018/0122379 | A1 | 5/2018 | Sohn | |
| 2018/0182387 | A1 | 6/2018 | Chua et al. | |
| 2018/0231653 | A1 | 8/2018 | Pradeep | |
| 2018/0322870 | A1 | 11/2018 | Lee | |
| 2018/0322881 | A1 | 11/2018 | Min et al. | |
| 2019/0286413 | A1 | 9/2019 | Hansson | |
| 2019/0318496 | A1 | 10/2019 | Lu et al. | |
| 2019/0318724 | A1 | 10/2019 | Chao et al. | |
| 2020/0066270 | A1 * | 2/2020 | Lee | ........................... G06F 3/00 |
| 2020/0092465 | A1 | 3/2020 | Lee et al. | |
| 2020/0104094 | A1 | 4/2020 | White et al. | |
| 2020/0143481 | A1 | 5/2020 | Brown et al. | |
| 2020/0184156 | A1 | 6/2020 | Badr et al. | |
| 2020/0218767 | A1 | 7/2020 | Ritchey et al. | |
| 2020/0278833 | A1 | 9/2020 | Noyes et al. | |
| 2020/0286467 | A1 | 9/2020 | Chao | |
| 2020/0302928 | A1 | 9/2020 | Sohn | |
| 2020/0349966 | A1 | 11/2020 | Konzelmann et al. | |
| 2020/0358912 | A1 | 11/2020 | Yamada | |
| 2021/0043208 | A1 | 2/2021 | Luan et al. | |
| 2021/0056967 | A1 | 2/2021 | Jang et al. | |
| 2021/0125611 | A1 * | 4/2021 | Yu | ......................... G10L 15/197 |
| 2021/0258641 | A1 | 8/2021 | Konzelmann et al. | |
| 2021/0275121 | A1 | 9/2021 | McLaughlin | |
| 2021/0375281 | A1 | 12/2021 | Gao | |
| 2022/0028379 | A1 | 1/2022 | Carbune et al. | |
| 2022/0076668 | A1 | 3/2022 | Carbune et al. | |
| 2022/0083908 | A1 | 3/2022 | Sharifi et al. | |
| 2024/0022809 | A1 | 1/2024 | Weissenberger et al. | |

FOREIGN PATENT DOCUMENTS

| | | |
|---|---|---|
| CN | 108718386 | 10/2018 |
| EP | 3583747 | 12/2019 |

OTHER PUBLICATIONS

Intellectual Property India; Hearing Notice issued in Application No. 202227064651; 4 pages; dated Mar. 22, 2024.
Japanese Patent Office; Notice of Reasons for Rejection issued for Application No. 2022-571847, 32 pages, dated Jan. 29, 2024.
European Patent Office; Examination Report issued for Application No. 21807392.2, 9 pages, dated Feb. 23, 2024.
Intellectual Property India; Examination Report issued in Application No. 202227064651; 12 pages; dated Aug. 21, 2023.

(56) References Cited

OTHER PUBLICATIONS

European Patent Office; International Search Report and Written Opinion issued in PCT Application No. PCT/US2021/055748; 20 pages; dated Feb. 10, 2022.
European Patent Office; Extended Search on Report issued in Application No. 25170796.4, 13 pages, dated May 26, 2025.
Japanese Patent Office; Notice of Reasons for Rejection issued for Application No. 2024097960, 5 pages, dated Jul. 1, 2025.
Korean Patent Office; Patent Rejection Decision issued n Application No. 10-2022-7042613; 10 pages; dated Jul. 2, 2025.
European Patent Office; Intention to Grant issued for Application No. 21807392.2, 48 pages, dated Dec. 4, 2024.
European Patent Office; Communication pursuant to Article 94(3) EPC issue in Application No. 25170796.4, 10 pages, dated Mar. 9, 2026.
China Intellectual Property, First Office Action issued in Application No. 202180039193.X, 28 pages, dated Mar. 1, 2026.
Japanese Patent Office; Notice of Refusal issued for Application No. 2024097960, 6 pages, dated Jan. 6, 2026.

* cited by examiner

200

COMPUTING DEVICE
202

ASSISTANT INTERFACE
220

APPLICATIONS
234

APPLICATION DATA
230

DEVICE DATA
232

CONTEXTUAL DATA
236

AUTOMATED ASSISTANT
204

ASSISTANT DATA
238

INPUT PROCESSING ENGINE
206

SPEECH PROCESSING ENGINE
208

DATA PARSING ENGINE
210

PARAMETER ENGINE
212

OUTPUT GENERATING ENGINE
214

ASSISTANT INVOCATION ENGINE
222

CONDITION ENGINE
218

FEATURE SCORE ENGINE
224

MODEL IDENTIFICATION ENGINE
226

REQUEST BIASING ENGINE
228

CAMERA CONTROL ENGINE
240

*FIG. 2*

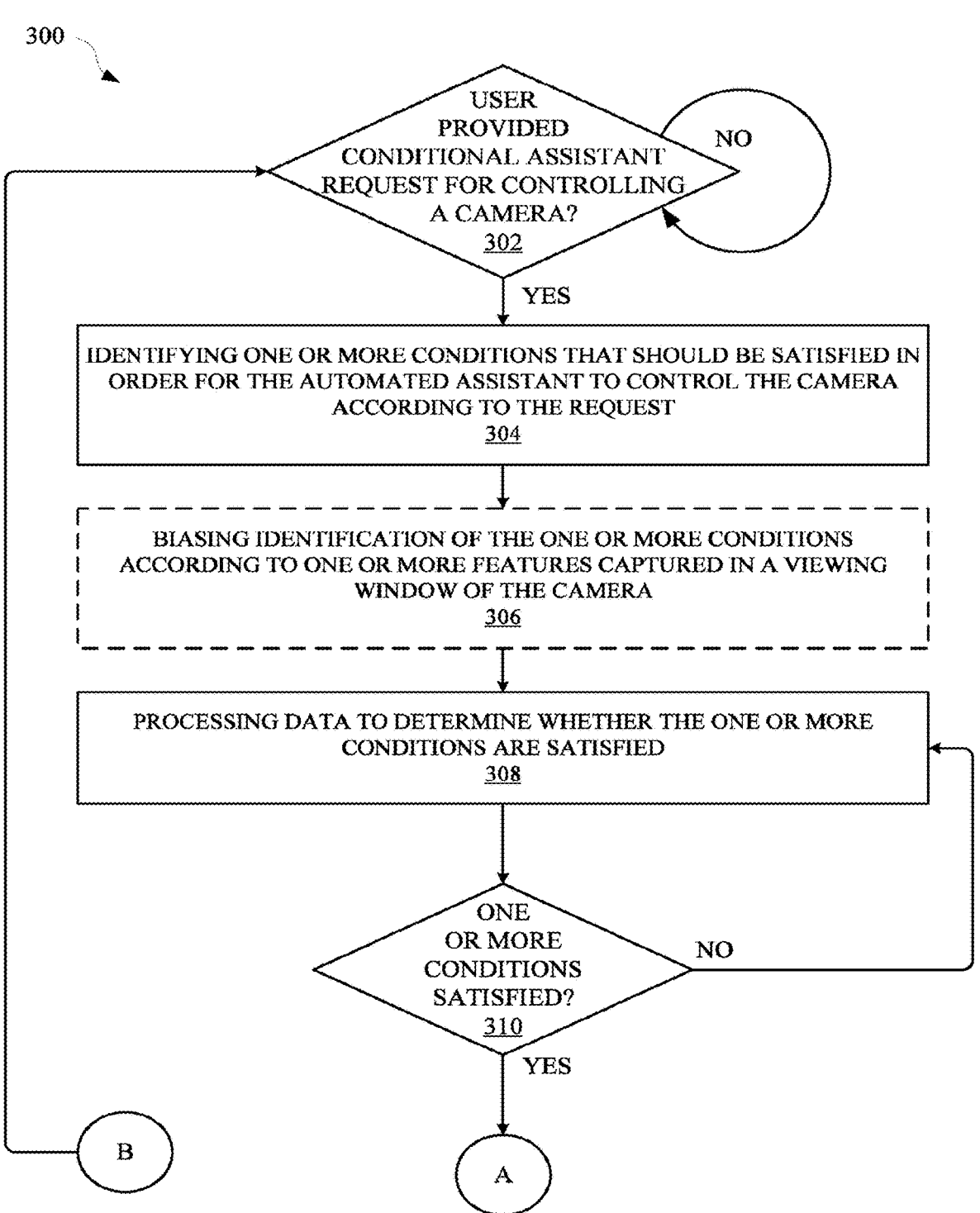

300

USER PROVIDED CONDITIONAL ASSISTANT REQUEST FOR CONTROLLING A CAMERA?
302

NO

YES

IDENTIFYING ONE OR MORE CONDITIONS THAT SHOULD BE SATISFIED IN ORDER FOR THE AUTOMATED ASSISTANT TO CONTROL THE CAMERA ACCORDING TO THE REQUEST
304

BIASING IDENTIFICATION OF THE ONE OR MORE CONDITIONS ACCORDING TO ONE OR MORE FEATURES CAPTURED IN A VIEWING WINDOW OF THE CAMERA
306

PROCESSING DATA TO DETERMINE WHETHER THE ONE OR MORE CONDITIONS ARE SATISFIED
308

ONE OR MORE CONDITIONS SATISFIED?
310

NO

YES

CAUSING THE CAMERA TO CAPTURE IMAGE DATA ACCORDING TO THE
REQUEST FROM THE USER
312

ONE
OR MORE
CONDITIONS NO LONGER
SATISFIED?
314

NO

YES

CAUSING THE CAMERA TO CEASE CAPTURING THE IMAGE DATA
ACCORDING TO THE REQUEST FROM THE USER
316

B

400

410

CONDITIONAL CAMERA CONTROL VIA AUTOMATED ASSISTANT COMMANDS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, a user can request that an automated assistant capture an image, such as a screen shot, photograph, or other type of image. However, the moment in which the automated assistant captures the image may be exclusively controlled by the user, thereby limiting the autonomy of the user when attempting to capture certain images. When a user wishes to capture a video or an image of a unique moment, the user may set a timer for the camera to capture the image or initialize recording of a video in order to capture a broad range of time that may include the unique moment. However, such strategies may result in various computational resources being consumed in order to capture the unique moment—which may not actually require much data to capture. For example, capturing the smile of a baby in a video may only require a couple seconds of video data—yet a user may record multiple videos of varying length in order to capture this relatively unique moment.

SUMMARY

Some implementations set forth herein relate to an automated assistant that allows a user to specify, through a spoken utterance, one or more conditions that should be satisfied in order for the automated assistant to control a camera for capturing image data. A condition can be, but is not limited to, a feature of an environment that can be observed, visually and/or audibly and through processing of corresponding sensor data, at an instance in time and/or over a period of time. In these and other manners, a single spoken utterance can be used to control a camera of a device to capture a unique moment, obviating the need for the user to directly handle the device. Additionally, this can obviate the need for the user to monitor an electronic viewfinder of the camera in determining when to explicitly direct the camera to capture image data, and/or obviate the need for the user to provide touch input(s) at interface(s) of the device to cause image data to be captured. Accordingly, implementations provide for simplified user inputs in controlling a camera, such a single spoken utterance for controlling the camera in response to environmental condition(s) being satisfied. Such implementations can be particularly beneficial to users with limited dexterity.

Furthermore, implementations can preserve computer memory, disk space, and/or battery life of a client device that includes the camera and that is utilized to capture the image data. For example, implementations can prevent the capture of errant image data generated and stored when a user was attempting to capture a particular unique moment with their camera. Accordingly, the errant image data will not occupy memory and/or disk space, and battery life will not be needlessly consumed in processing such image data. As another example, some implementations can suppress rendering of an electronic viewfinder responsive to certain or all spoken utterances for controlling a camera responsive to condition(s) being satisfied, thereby conserving battery resources that would otherwise be consumed by such rendering.

As an example, and in accordance with some implementations, a user can request that the automated assistant capture a video of a pet performing a trick by providing a spoken utterance such as, "Assistant, take a video of my dog fetching this toy." The spoken utterance can be received at, for example, a portable computing device that includes a camera, which the user is orienting in a direction of a pet. The portable computing device can provide access to an automated assistant that, in response to the spoken utterance, can process natural language content of the spoken utterance in order to identify a request embodied in the spoken utterance. For example, the automated assistant can determine that the user is requesting that the automated assistant control the camera to capture certain image data when various conditions are satisfied. The automated assistant can then identify, based on the spoken utterance, a first condition that is satisfied when a dog and a toy are observed in image data captured by the camera. The automated assistant can also identify a second condition that is satisfied when the dog is determined to likely begin retrieving the toy and/or is in the process of retrieving the toy.

In some implementations, the automated assistant can identify one or more trained machine learning models that can be used when processing data for determining whether the conditions are satisfied. For example, a particular trained machine learning model, which can be used when identifying an animal, can be selected by the automated assistant in response to the request in order to assist with processing image data being generated using the camera. Alternatively, or additionally, another trained machine learning model can be selected for assisting with determining whether image data indicates that a particular action (e.g., a dog fetching a toy) has been performed. Alternatively, or additionally, the automated assistant can rely on one or more trained machine learning models that can be used for processing other data that can include audio data, image data, application data, and/or any other suitable data that can be used for determining whether a condition has been satisfied.

In some implementations, one or more trained machine learning models can be stored locally at a client device in order to reduce latency between certain conditions occurring and those certain conditions being recognized. Furthermore, this can reduce an amount of data that would be offloaded to a separate device for further processing, thereby reducing network traffic. In some implementations, when a particular trained machine learning model is not locally stored at a client device, the particular trained machine learning model can be downloaded from a remote server or other device. The automated assistant can optionally provide an indication that, although a request from a user can be handled by the automated assistant, there will be a delay as a result of network activity (e.g., downloading a particular trained machine learning model).

When the automated assistant has received the request from the user, the automated assistant can begin to determine whether the first condition and the second condition have been satisfied. In some implementations, this can involve processing image data from the camera and/or audio data from a microphone that is integral to the computing device. For example, an image that includes a dog and a toy can satisfy the first condition, and a portion of video data that shows the user throwing the toy away from the dog can satisfy the second condition. In some implementations, the data that is used to determine whether certain conditions are satisfied can be stored temporarily in memory (e.g., RAM), but the media data that is captured when the conditions are satisfied can be stored according to the request from the user. In this way, the user does not need to leave the camera application to manually delete a substantial amount of image data before and after the conditions are satisfied. Rather, the user can rely on the automated assistant to determine the media data that will be stored (e.g., in hard drive space) as the file that the user requested the automated assistant to generate.

When the automated assistant determines that the conditions are satisfied, the automated assistant can cause the camera to record media data starting from when the conditions are satisfied. In some implementations, when a request from the user corresponds to a request to capture a single image, the automated assistant can cause the camera to capture one or more images when one or more conditions are satisfied. Alternatively, or additionally, when a request from the user corresponds to a request to capture a video, the automated assistant can cause the camera to capture a video starting from when the one or more conditions are satisfied and ending when the one or more conditions are no longer satisfied. For instance, in the aforementioned example, the automated assistant can determine that the dog had completed fetching the toy and therefore the second condition was no longer satisfied. Based on this determination, the automated assistant can cause the camera to no longer record video, and store the captured video.

In some implementations, the user can cause the automated assistant to initialize recording another video by continuing to play "fetch" with their dog without necessarily providing the automated assistant with another spoken utterance or other explicit request. For example, subsequent to the automated assistant causing the camera to capture a first video of the dog fetching the toy, the automated assistant can continue to determine whether first condition and the second condition are satisfied. When the automated assistant determines that the user has directed their dog to fetch the toy again, the automated assistant can determine that the first condition and the second condition are satisfied again, and then cause the camera to capture a second video. In this way, the user can rely on the automated assistant to capture unique moments via the camera without necessarily requiring the user to directly handle their portable computing device. Furthermore, this can reduce waste of computational resources that might otherwise be consumed when a user allows their camera to record a long video that is meant to capture a moment that is much shorter than the entire duration of the recorded video.

In some implementations, a user can direct the automated assistant to modify one or more camera settings and/or image properties before, during, and/or after the automated assistant has caused a camera to capture image data. For example, the user can be directing the camera at a group of people, and, when the user has joined the group of people in order to capture a selfie, the user can view a camera preview at a computing device that is controlling the camera (e.g., view the camera preview through a rendered electronic viewfinder). The camera preview can show the user standing with the group, and the user can determine that they do not like the amount of glare reflecting off the face of the user. Based on this determination, the user can provide a spoken utterance such as, "Assistant, reduce the amount of glare that is reflecting from my face." In response to this spoken utterance, the automated assistant can adjust a camera setting and/or an image property in order to reduce the amount of glare in the camera preview. The user can then acknowledge that the camera preview is providing a suitable image and provide a spoken utterance such as, "Assistant, that's great. Please take a picture when everyone's eyes are open." In response, the automated assistant can cause the camera and/or image settings to be maintained (e.g., for reducing glare), and then cause the camera to capture an image when the automated assistant determines that all persons in the image have their eyes open. Alternatively, the user can make further adjustments to camera settings and/or image settings by providing another spoken utterance such as, "Assistant, make the background lighter," in order to cause the automated assistant to adjust a setting of the camera or other image application in order to modify the image to be captured via the automated assistant.

In some implementations, the user may elect to capture an image manually (e.g., by selecting a GUI element for snapping a photo), but may provide the automated assistant with requests for certain adjustments. For example, the user can provide a spoken utterance such as, "Assistant, make the image black and white." In response, the automated assistant can cause the camera viewfinder to render a black and white preview of the environment that the user is directing their camera at. When the user is satisfied with the preview, the user can tap a GUI element to capture an image. In this way, the user does not have to cycle back and forth between camera application interfaces in order to adjust certain settings of the camera. Rather, the user can rely on voice interactions with the automated assistant to make certain image and/or camera adjustments simultaneous to directing the camera in a particular environment.

In some implementations, the user can provide a command that employs the automated assistant to make adjustments and also determine whether the adjustments are suitable before ceasing making further adjustments. For example, the user can provide a command such as "Assistant, fix the red eye in the image," and, in response, the automated assistant can identify certain portions of an image preview that includes "red eye" (e.g., via bounding boxes) and make color adjustments in order to eliminate the red eye. When the red eye is determined to be eliminated, the user and/or the automated assistant can cause an image to be captured.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 illustrates a system that provides an automated assistant that can control a camera according to one or more conditions specified via an input request.

FIG. 3A and FIG. 3B illustrate a method for invoking an automated assistant to conditionally control a camera to capture image data when one or more conditions are satisfied.

DETAILED DESCRIPTION

Figure 1A:
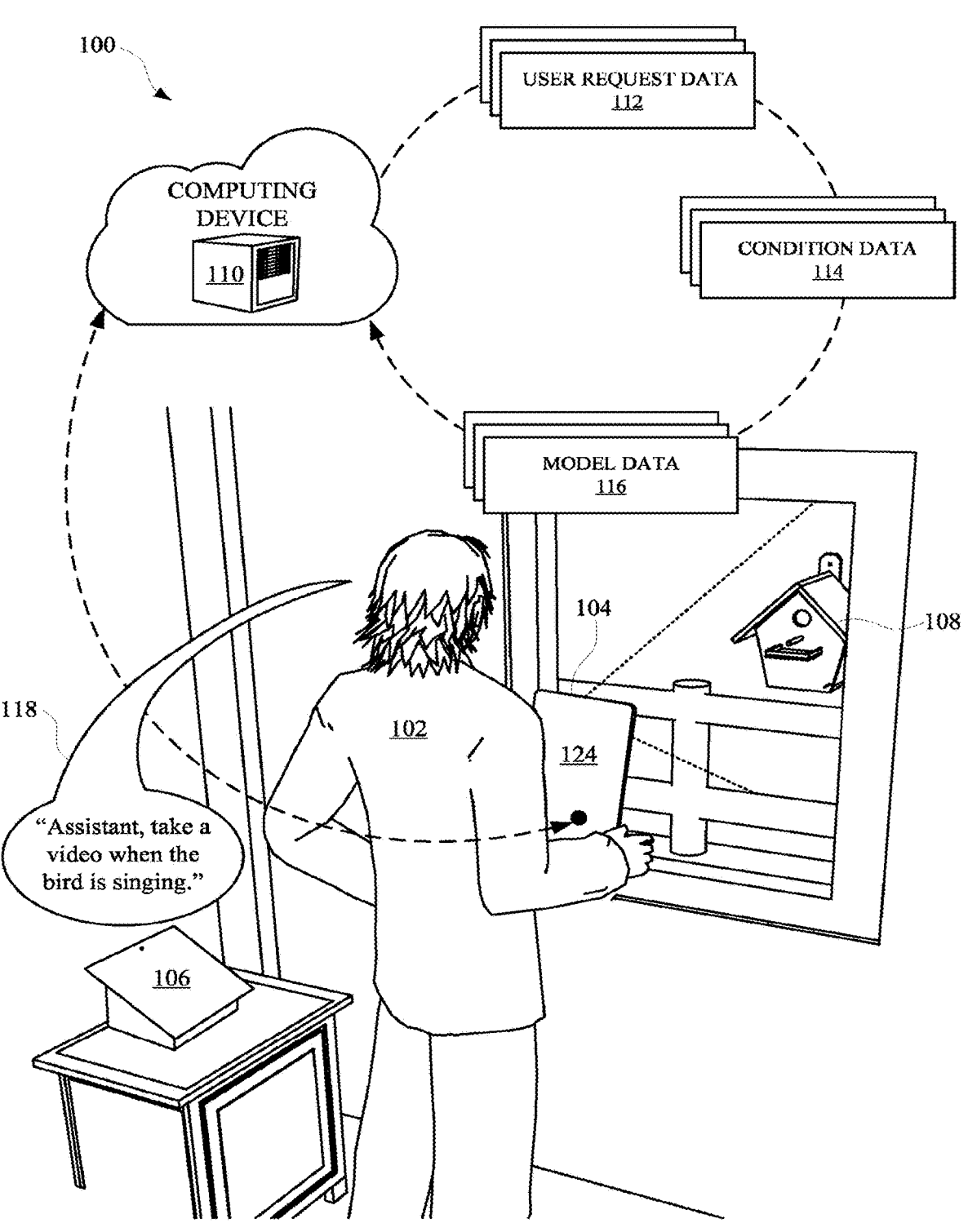
FIG. 1A and FIG. 1B illustrate views of a user invoking an automated assistant to capture image data when one or more conditions are satisfied.
Figure 1B:
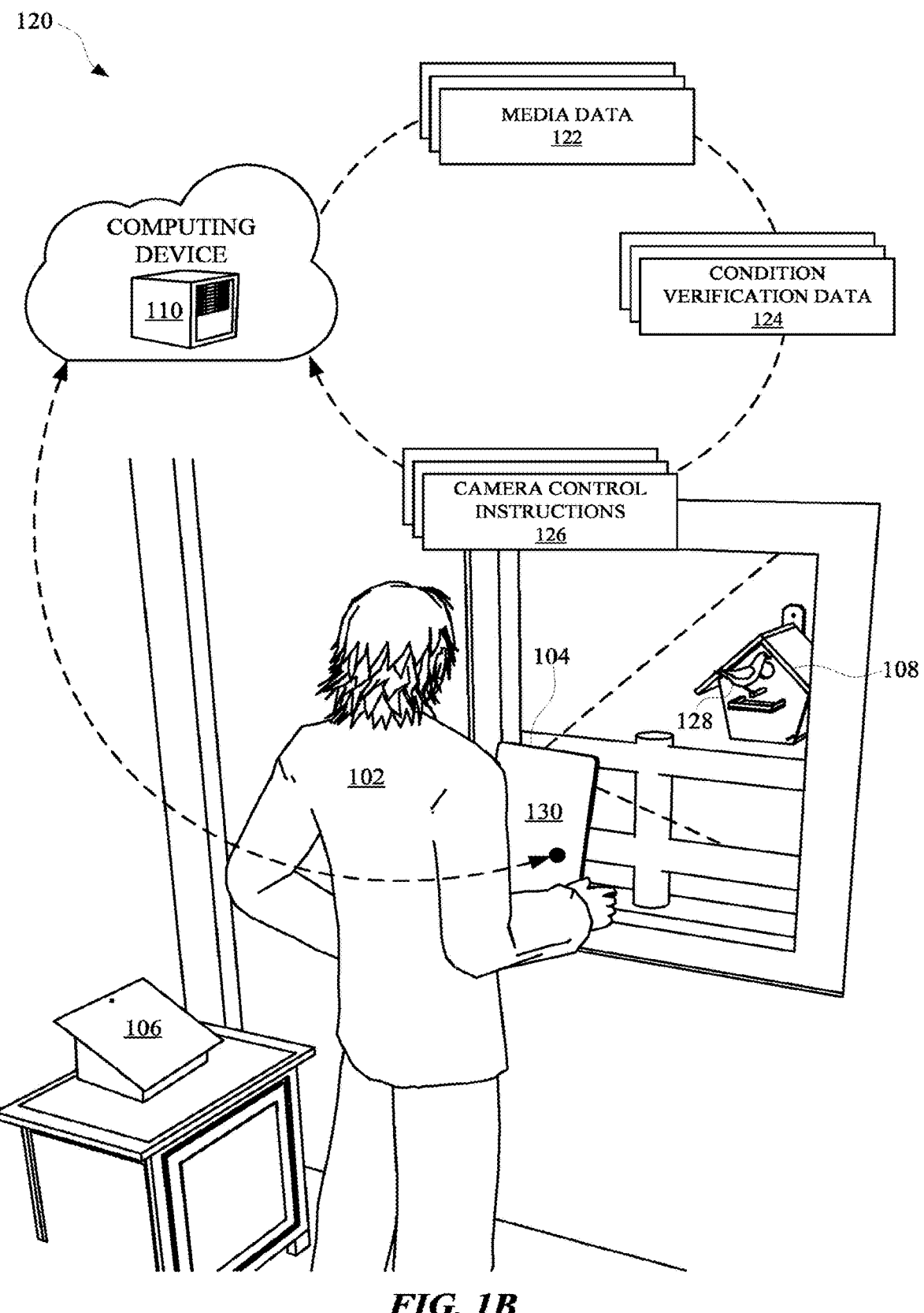

FIG. 1A and FIG. 1B illustrate a view 100 and a view 120, respectively, of a user 102 invoking an automated assistant to capture image data when one or more conditions are satisfied. The user 102 can provide a request for the automated assistant to conditionally capture an image in order that the user 102 is not exclusively responsible for directly contacting a touch interface of the camera in order to capture a unique moment. For example, the user 102 can provide a spoken utterance 118 such as, "Assistant, take a video when the bird is singing." The spoken utterance can be received at a computing device 104 and/or another computing device 106, which each can provide access to a camera, respectively. For example, the computing device 104 can include a camera that can be manually directed and/or electromechanically directed to a location of interest in order to capture a particular image and/or video. The other computing device 106 can be an assistant device that is typically posed in a static arrangement, but includes a camera to capture images and/or video of anything within a viewing window of the other computing device 106. In some implementations, each assistant device that is accessible to the user 102 can cooperate to identify one or more particular assistant devices that each include a respective camera that is arranged in a manner that is most suitable for determining whether one or more conditions are satisfied. This determination can be base on, for example, a subject matter of a condition and an ability of each particular assistant device to provide image data that most clearly captures the subject matter of the condition (e.g., a highest quality image, highest resolution, lowest latency, least amount of interference, etc.).

In response to receiving the spoken utterance 118, the computing device 104 or the computing device 106 can process audio data characterizing the spoken utterance 118. The audio data can be processed in order to determine that the spoken utterance 118 includes a request for the automated assistant to capture media data according to one or more conditions. In some implementations, the audio data can be processed at the computing device 104, the computing device 106, and/or a computing device 110 in order to generate user request data 112. The user request data 112 can characterize one or more intents and/or slot values for fulfilling the request from the user 102. The user request data 112 can be further processed in order to generate condition data 114, which can characterize one or more conditions that should be satisfied before the automated assistant executes the intents identified in the user request data 112. For example, the condition data can characterize a first condition for detecting a presence of a bird and a second condition for detecting singing from the bird.

In some instances, when a first condition can be satisfied with audio data and a second condition can be satisfied using image data, the automated assistant can reduce an amount of image data that is processed until the first condition is satisfied. For example, processing of image data from an image feed of a camera can be limited and/or ceased until the automated assistant determines that audio data from an audio feed of a microphone satisfies a particular condition. In this way, the automated assistant can optimize usage of computational resources while still being responsive to conditional requests from the user 102.

In some implementations, data associated with the condition(s) specified by the user 102 can be processed in order to generate model data 116, which can identify one or more trained machine learning models. The trained machine learning models can be used by the computing device 110 or another computing device when processing data for determining whether one or more conditions are satisfied. For example, the trained machine learning models can include a first trained machine learning model that can be used when determining that a bird is present in a viewing window of the camera. Alternatively, or additionally, the trained machine learning models can include a second trained machine learning model that can be used when determining that audio corresponding to a bird singing is being detected.

In some implementations, when the automated assistant determines that the spoken utterance corresponds to a request for controlling the camera based on one or more conditions, the automated assistant can bypass activating a viewfinder GUI for the camera of the computing device 104. In other words, even though the user 102 has requested that a camera operation be performed, the automated assistant can cause the viewfinder GUI to be deactivated, or otherwise not rendered, in order to preserve battery and processing bandwidth. The viewfinder can be bypassed in this way because the user 102 does not necessarily need to preview any images when the automated assistant is controlling the camera for such requests.

In some implementations, the condition data 114 can be processed in order to determine whether to bias speech processing that is employed by the automated assistant. Alternatively, or additionally, when data is processed using one or more selected trained machine learning models, the speech processing can be biased according to one or more results of the data processing. For example, when the spoken utterance 118 is received by the automated assistant and the automated assistant initializes a camera of the computing device 104 in order to determine whether one or more conditions are satisfied, objects in a viewing window of the camera can be a basis for further biasing the speech processed for the automated assistant. For instance, in response to the spoken utterance 118, the automated assistant may have ranked "girl" higher than the word "bird," thereby causing the automated assistant to conclude that the conditions relate to the presence of a girl singing. However, when image data from the camera is processed using a selected trained machine learning model, the automated assistant can determine that a birdhouse 108 is present in the viewing window of the camera. Based on this determination, the automated assistant can alter a respective score of one or more candidate terms in order that the term "bird" is prioritized over the term "girl." As a result, the condition data 114 can be modified in order to indicate that the conditions are associated with a "bird" singing instead of a "girl" singing.

In some implementations, image data and/or speech data can be processed in order to perform bi-directional biasing of further processing of the image data, speech data, and/or other request related data. For instance, processing of speech data can result in a hypothesis regarding, and/or subject matter of, one or more requests that the user would like to automated assistant to fulfill. Additionally, processing of image data can result in certain object classifications being identified. Further operations can then be performed in order to bias any subsequent processing of the speech data according to the object classifications, and also bias any further processing of image data according to the hypothesis or subject matter of the one or more requests.

In some implementations, image processing can be biased according to one or more results of processing audio data provided by the user 102 to the automated assistant. For example, various objects in a viewing window of the camera can be characterized by image data generated by the computing device 130. The image data can undergo processing in order to identify bounding boxes around several objects. Audio data captured near the time of the capturing of the image data can be used to bias identifiers for particular objects. For example, the automated assistant may initially prioritize the term "house" for assigning to the bounding box around the birdhouse 108 in the image data. The term "house" can be initially prioritized over other candidate terms such as "wood," "box," "opening," and "birdhouse." However, because the user 102 identified the term "bird" in the spoken utterance 118 can bias the priorities of the candidate terms such that "birdhouse" is prioritized over all other candidate terms. In this way, image data can be more accurately processed when determining whether certain conditions are satisfied for a particular conditional request from the user 102.

In some implementations, the automated assistant can cause the computing device 110, the computing device 104, and/or the computing device 106 to process media data 122 in order to determine whether one or more conditions associated with a request are satisfied. In some implementations, a computing device that processes data to determine whether one or more conditions are satisfied can be different from another computing device that includes the camera that is used to capture the image in response to a request from the user 102. For example, the media data 122 can characterize data being generated via one or more interfaces of one or more computing devices. In some implementations, the media data 122 can characterize content of a graphical user interface (GUI) 130 of the computing device 104. Alternatively, or additionally, the media data 122 can characterize audio received at a microphone of the computing device 104 and/or light received at a camera of the computing device 104. In some implementations, when the computing device 110 or the computing device 104 determines that one or more conditions have been satisfied, condition verification data 124 can be generated. The condition verification data 124 can indicate to the automated assistant that one or more conditions of a request have been satisfied and, based on this data, the automated assistant can generate camera control instructions 126.

In some implementations, the media data 122 can be produced by sampling a camera feed at a lower sampling rate that would otherwise be used for capturing an image or a video using the camera. Alternatively, or additionally, the media data 122 can be produced by adjusting a resolution of images captured via the camera feed in order to capture images of lower resolution that would otherwise be used for capturing an image or a video using the camera. In this way, computational resources can be preserved when verifying that one or more conditions of a conditional request have been satisfied. In some implementations, a sampling rate and/or a resolution of data for determining whether one or more conditions are satisfied can be dynamically selected based on the one or more conditions identified by the user 102. For example, a first sampling rate and/or a first resolution can be selected when a condition is associated with active movement (e.g., a dog jumping), and a second sampling rate and/or a second resolution that is lower than the first sampling rate and/or first resolution, can be selected when the condition is associated with a more static feature (e.g., a baby is smiling).

In accordance with FIG. 1B, the media data 122 can characterize an image of a bird 128, which can be processed using one or more trained machine learning models in order to verify that the image includes a feature such as the bird 128. Alternatively, or additionally, the media data 122 can characterize audio that includes the bird 128, and the audio can be processed using one or more other trained machine learning models in order to verify that the audio includes a feature such as the bird 128 singing. In some implementations, when the media data 122 indicates that the conditions of a request have been satisfied, the automated assistant can initialize performance of an operation such as capturing one or more images and/or one or more videos. For example, the automated assistant can provide camera control instructions 126 to the camera of the computing device 104 in order to create media data while the first condition and the second condition are satisfied.

In some implementations, the camera control instructions 126 can include one or more parameters for controlling one or more cameras. For example, the camera control instructions 126 can include data that causes the camera to focus on a portion of a viewing window of the camera that includes the bird 128. Alternatively, or additionally, camera control instructions 126 can include data that causes the camera to capture images and/or video of the bird 128 until the bird 128 is no longer in a viewing window of the camera and/or until the bird 128 is no longer emitting audible sound and/or no longer singing. Alternatively, or additionally, the camera control instructions 126 can include data that causes the camera to zoom in on a feature of the environment that is associated with one or more conditions corresponding to a request from a user.

In some implementations, the user 102 can specify that the automated assistant should condition the camera operation on one or more application features. For example, the user 102 can provide a spoken utterance such as, "Assistant, take a video when the bird shown on this website is present and singing." In this way, the automated assistant can condition a camera operation on identifying a bird that is the same type of bird that is rendered at a GUI 130 of the computing device 104 or a GUI of the computing device 106. In this way, the condition data 114 can characterize one or more features of an application that is accessible via the computing device 104. For example, the GUI 130 can render a website that includes a graphic of a cardinal bird and the automated assistant can consider the first condition satisfied when a cardinal bird is present in a viewing window of the computing device 104. When the second condition (e.g., the cardinal bird is singing) is satisfied, the automated assistant can initialize performance of the camera operation according to the spoken utterance from the user 102. Alternatively, or additionally, the camera operation can be conditioned upon a state of an application that is accessible via the computing device 104. Therefore, when a particular application exhibits a particular state (e.g., completes a particular operation), the automated assistant can cause a specified camera operation to be performed.

In some implementations, an instance of image data captured by the camera can include one or more images, captured at one or more instances in time, and/or captured using one or more different cameras. Alternatively, or additionally, the camera can capture image data when one or more sensors of the camera are active, and a computing device, which is connected to the camera, is generating one or more images from the image data. Alternatively, or additionally, image data is captured when image data is stored in a memory of a computing device, such as in a ROM and/or a hard drive space. Alternatively, or additionally, an image can be considered captured by a camera when an application selects the image from an image feed that is generated using the camera.

In some implementations, one or more images can be used to determine whether one or more conditions are satisfied and/or can be used for storing as the particular image data that a user has requested. For example, when the user 102 provides the spoken utterance 118, the automated assistant can cause the camera to capture image data at 50 frames per second (FPS) until the specified conditions are satisfied. When a particular image from the captured image data is determined to satisfy the specified conditions, the automated assistant can cause that particular image to be stored and the other captured image data to be deleted. In some implementations, when a request corresponds to capturing a video, image data can be captured at a first frame rate until certain conditions are satisfied. When the certain conditions are satisfied, the automated assistant can cause video to be captured at a second frame rate that is greater than the first frame rate. Alternatively, or additionally, the automated assistant can cause the video data captured at the first frame to be deleted, in order to preserve memory at the computing device 104.

FIG. 2 illustrates a system 200 that provides an automated assistant 204 that can control a camera according to one or more conditions specified via an input request. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of, and/or objects in, an environment in which the automated assistant 204 is accessible, and/or one or more features of a user that is predicted to be intending to interact with the automated assistant 204. The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202. In some implementations, audio data processing can occur in view of corresponding image counterparts, such that features identified in image data can be used to promote the accuracy of the audio data processing. Feature extraction of images can be performed at the service device and/or at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on a current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant.

When the one or more trained machine learning models are trained according to these instances of training data, the assistant invocation engine 222 can cause the automated assistant 204 to detect, or limit detecting, spoken invocation phrases from a user based on features or properties of, and/or objects in, a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the system 200 can include a condition engine 218 that can be used to identify one or more conditions that a requested operation can be contingent upon. A user can request that an operation be contingent upon one or more conditions in order that the user does not necessarily have to rely on themselves exclusively to determine when the one or more conditions are satisfied. Such contingent requests can be used to control one or more applications, devices, and/or any other apparatus or module capable of being controlled by a computer. For example, the condition engine 218 can be used to identify one or more conditions for controlling a camera that is in communication with the computing device 202.

In some implementations, when a condition corresponds to a particular feature of an environment, the condition engine 218 can specify a threshold confidence score that a detected feature should satisfy in order for the corresponding condition to be satisfied. For example, the system 200 can include a feature score engine 224 that can be used to process data for assigning a score to each respective feature that has been identified. For instance, when a condition for a particular operation is contingent upon a particular object being identified (e.g., a type of bear), the feature score engine 224 can process data to identify features in data that are evidence of a presence of the particular object. In some implementations, in order to assign a score (e.g., a confidence score) to a particular feature, the system 200 can include a model identification engine 226, which can be used to identify a particular trained machine learning model that may be used when processing the image data. For example, when a condition is the presence of a type of bear, the model identification engine 226 can identify a trained machine learning model that can be used when processing images to determine whether a particular image includes a particular type of bear. When processing the images, a score can be generated by the feature score engine 224 for a particular feature that may be present in one or more images. When the score satisfies a threshold score for the condition, the automated assistant 204 can determine that the condition is satisfied and proceed with fulfilling the corresponding request accordingly.

In some implementations, the system 200 can include a request biasing engine 228 that processes data related to a request from the user in order to determine whether or not to bias certain processing of the request according to contextual data 236, device data 232, and/or application data 230. For example, a user can provide a conditional request for the automated assistant to control a camera and, based on this conditional request, the request biasing engine 228 can bias processing of the conditional processing of the request according to features identified in a viewing window of the camera. For instance, when the conditional request is embodied in a spoken utterance such as, "Assistant, take a video when the dog is lying down," may initially be interpreted as "Assistant, take a video when the 'dock' is lying down." However, there may be a dog located in a viewable range of the camera and, therefore, the request biasing engine 228 can bias speech processing of the spoken utterance in order that the term "dog" is prioritized or otherwise ranked over the term "dock." As a result, the automated assistant 204 can operate to cause a video to be captured when a "dog" is laying down in a viewing window of the camera, instead of attempting to determine whether a "dock" is present.

In some implementations, data can be cached in order that the data can be subsequently processed again in view of additional data that may become available and provide some amount of corrective context. For example, some amount of the audio data corresponding to the spoken utterance can be stored in cache until additional audio data is provided by a user to correct a misinterpretation of the initial audio data. For instance, upon recognizing a misinterpretation, the user can provide another spoken utterance such as, "No, the 'dog' not the dock." The initial audio data can then be retrieved from the cache and re-processed with some amount of biasing in view of the other spoken utterance. Alternatively, the dog may not initially be in a viewing window of the camera when the user provides the spoken utterance. However, when the dog is captured in initial image data and classified as a dog, the initial audio data from the cache can be re-processed with some amount of biasing (e.g., based on the classification) in order to modify an initial interpretation of audio data regarding about the term "dock" to the term "dog."

When one or more conditions associated with a request are satisfied, a camera control engine 240 can generate one or more instructions for the camera. The one or more instructions can be to capture one or more images, videos, and/or other media data based on a request from one or more users. In some implementations, the one or more instructions can include other parameters such as time period for capture, time to capture, focal point, pan instructions, zoom instructions, and/or any other parameters that can be specified for controlling a camera. For example, when the user requests that the automated assistant 204 capture a video of a particular object, the camera control engine 240 can generate instructions for the camera to start filming the particular object, as well as causing a photo application to crop the video based on the particular object. In this way, a video that is generated in response to the command will appear to be focused primarily on the particular object—without necessitating that the user manually and directly interact with a touch interface of a computing device to start capturing video, stop capturing video, and/or editing the video.

Figure 3B:
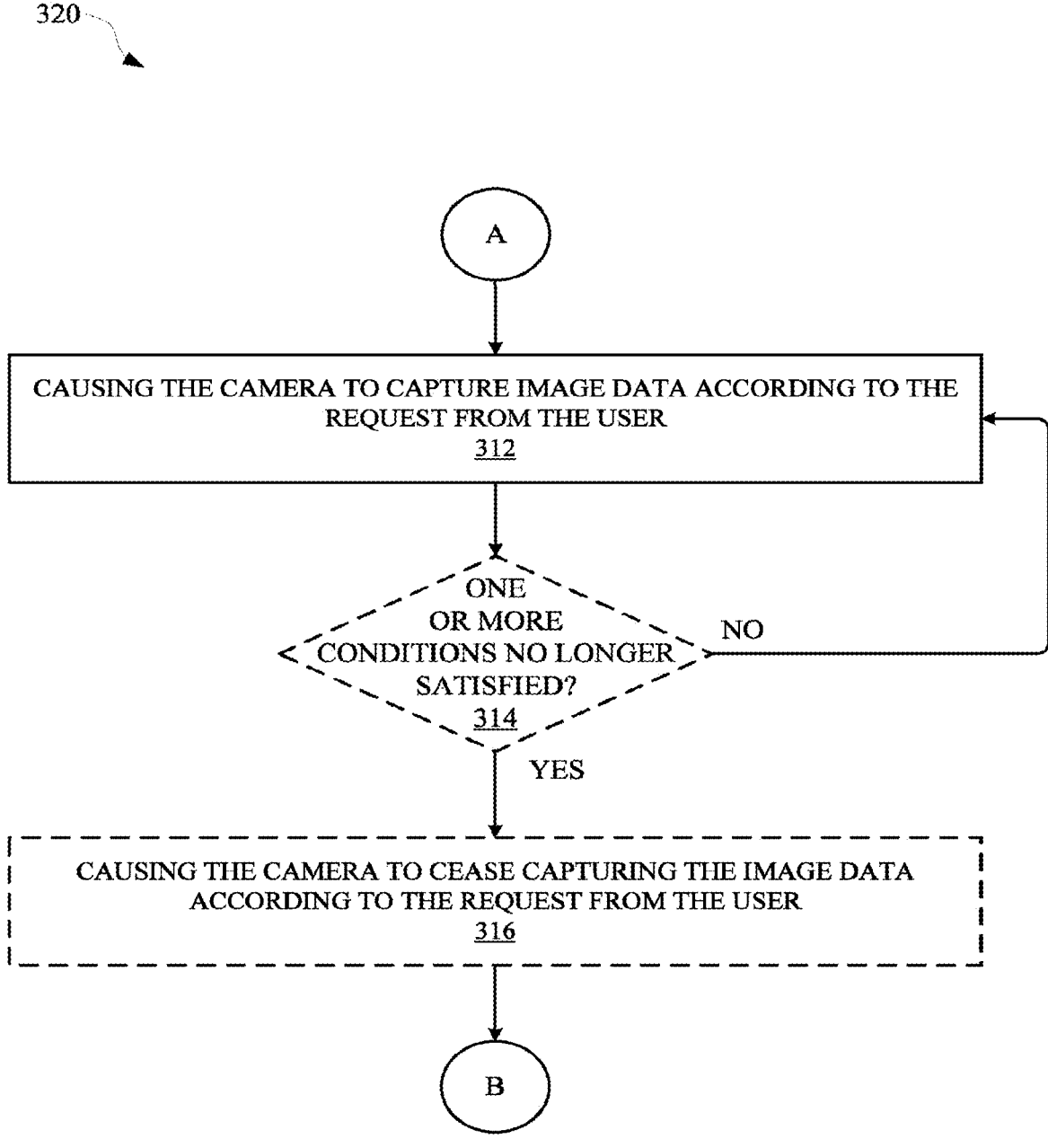

FIG. 3A and FIG. 3B illustrate a method 300 and a method 320 for invoking an automated assistant to conditionally control a camera to capture image data when one or more conditions are satisfied. The method 300 can be performed by one or more computing devices, applications, and/or any other apparatus or module that can be associated with an automated assistant. The method 300 can include operation 302 of determining whether a user has provided a conditional assistant request for controlling a camera. The conditional assistant request can be embodied in a spoken utterance or another input that is received at a computing device, which provides access to an automated assistant. The spoken utterance can be, for example, "Assistant, when you see my kids dancing tomorrow at the house, take a picture," which the automated assistant can respond to with prior permission from any affected persons. The user can provide this spoken utterance when they are hosting a party at their house and may not have the convenience to manually take pictures to capture certain moments. When the automated assistant receives a conditional assistant request, the method 300 can proceed to an operation 304. Otherwise, the automated assistant can continue to determine whether the user has provided a conditional assistant request for controlling a camera.

The operation 304 can include identifying one or more conditions that should be satisfied in order for the automated assistant to control the camera according to the request. The one or more conditions can be identified by processing audio data that characterizes the one or more conditions. For example, the automated assistant can identify a first condition that can be satisfied when a child of the user is identified, with prior permission from any affected person, in a viewing window of a camera that is accessible to the automated assistant. Additionally, the automated assistant can identify the second condition that can be satisfied when the child is dancing during the next day.

The method of 300 can proceed from the operation 304 to an optional operation 306, which can include biasing identification of the one or more conditions according to one or more features and/or objects captured in a viewing window of a camera. For example, the user can have a contact named "Niece," and when the automated system is identifying the first condition, the word "Niece" can be initially scored or otherwise prioritized over the word "kids." However, the automated assistant can process contextual data, such as features within a viewing window of the camera, to determine that the "kids" of the user were present with the user when the user provided the spoken utterance. In some implementations, this determination can be based on processing image data using one or more facial recognition models. Based on this determination, the automated assistant can modify the score or priority of the word "kids," such that "Kids" becomes part of the first condition instead of the name "Niece."

The method 300 can proceed from the operation 306 or the operation 304 to an operation 308, which can include processing data to determine whether the one or more conditions are satisfied. The data can include, but is not limited to, data that is generated using one or more interfaces that are accessible to the automated assistant. For example, audio data from a microphone of a computing device can be processed in order to determine, with prior permission from any affected person, whether a voice signature corresponding to the user's child has been identified. Alternatively, or additionally, image data from one or more cameras in communication with the computing device can be processed in order to determine whether the user's child is present in a viewing window of the camera and/or is dancing within the viewing window of the camera. In some implementations, contextual data such as time, geographic location, and/or any other information associated with a context of the user can be processed. For example, temporal data can be processed to determine whether the current day is the day following the spoken utterance from the user.

The method 300 can proceed from the operation 308 to an operation 310, which can include determining whether the one or more conditions are satisfied. When the one or more conditions are determined to have not been satisfied, the method 300 can return to the operation 308. Alternatively, when the one or more conditions have been determined to be satisfied, the method can proceed from the operation 310, via continuation element "A," to an operation 312, illustrated at method 320 in FIG. 3B. The operation 312 can include causing the camera to capture image data according to the request from the user. For example, when the request is specific to a single photo, the automated assistant can cause the camera to capture one or more images, with prior permission from any persons that may be captured in the images. Alternatively, when the request is specific to a video, the automated assistant can cause the camera to capture one or more videos. Prior to capturing a photo or video, the automated assistant can render a prompt for one or more persons (e.g., a child of the user) to select, in order for the persons to confirm that the automated assistant does, or does not, have permission to capture a photo or a video of those persons. In some implementations, the method 320 can proceed via the continuation element "B" in FIG. 3B to the continuation element "B" in FIG. 3A. Alternatively, the method 320 can optionally proceed from the operation 312 to an operation 314.

The operation 314 can include determining whether one or more conditions are no longer satisfied. For example, when the first condition and the second condition of the aforementioned example are no longer satisfied, the method 320 can proceed to an optional operation 316. The operation 316 can include causing the camera to cease capturing the image data according to the request from the user. However, when the first condition and the second condition remain satisfied, the method 320 can return to the operation 312. In this way, the user does not necessarily have to continually look for certain unique moments but can rely on the automated assistant to detect certain unique moments.

Figure 4:
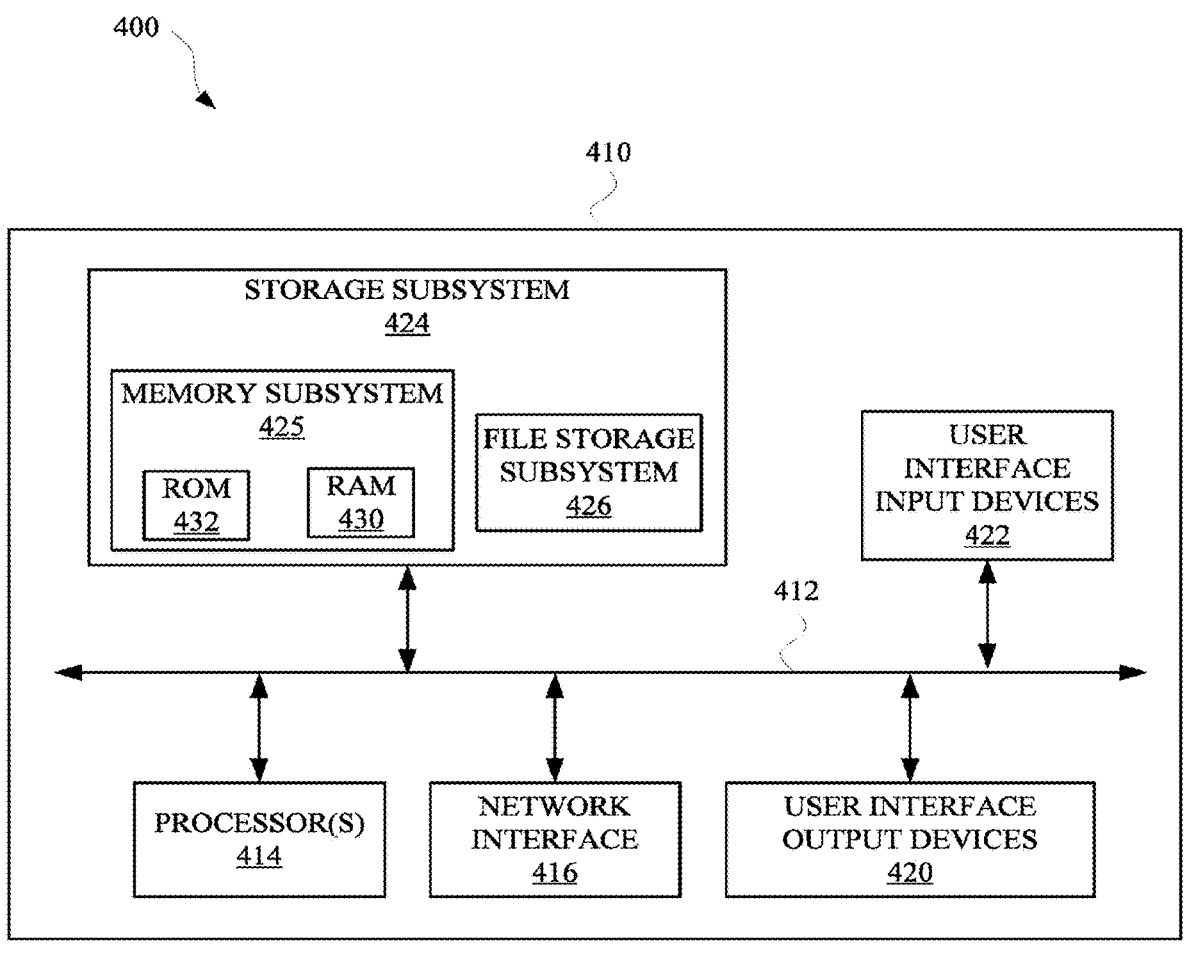
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of system 200, computing device 104, computing device 110, computing device 106, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including an operation such as receiving, by a computing device, a spoken utterance from a user. The computing device can provide access to an automated assistant and a camera. The method can further include an operation of determining, based on the spoken utterance, that the spoken utterance includes a request for the automated assistant to modify an image and/or a camera setting. The spoken utterance can specify one or more properties of an image to adjust prior to the user selecting a GUI element to capture an image. The method can further include an operation of causing, based on the one or more features, image data to be modified according to the request from the user. For example, the image data can correspond to one or more images being rendered in a viewfinder and/or preview window for a camera. When the image data has been modified according to the request, the user can select the GUI element in order to capture a suitable image.

In some implementations, a method implemented by one or more processors is set forth as including operations such as receiving, at a computing device, a spoken utterance that is directed to an automated assistant that is accessible via the computing device. In some implementations, the computing device also provides access to a camera. The method can further include an operation of determining, based on the spoken utterance, that a user is directing the automated assistant to control the camera according to whether one or more conditions are satisfied. In some implementations, the one or more conditions are described in natural language content of the spoken utterance. The method can further include an operation of determining, based on data that is available to the automated assistant, whether the one or more conditions are satisfied. In some implementations, the method can further include an operation of, when the one or more conditions are satisfied: causing the camera to capture image data.

In some implementations, determining that the user is directing the automated assistant to control the camera according to whether one or more conditions are satisfied includes: accessing, based on the natural language content of the spoken utterance, current image data that is based on an operation of the camera, and biasing processing of audio data, corresponding to the spoken utterance, based on one or more objects that are present in the current image data. In some implementations, determining whether the one or more conditions are satisfied includes: processing, in response to receiving the spoken utterance, other audio data that captures audio in an environment of the computing device or another computing device, and determining whether the other audio data includes one or more audio features that satisfy the one or more conditions. In some implementations, determining whether the one or more conditions are satisfied includes: processing, in response to receiving the spoken utterance, other image data that captures one or more visual features of an environment of the computing device or another computing device, and determining whether the one or more visual features satisfy the one or more conditions.

In some implementations, causing the camera to capture the image data includes: modifying, based on the natural language content of the spoken utterance, one or more settings of the camera. In some implementations, the image data is captured when the camera is operating according to the one or more settings. In some implementations, determining whether the one or more conditions are satisfied includes: processing, in response to receiving the spoken utterance, application data that indicates a state of an application that is accessible via the computing device or another computing device, and determining whether the state of the application satisfies the one or more conditions. In some implementations, the computing device is a portable computing device and the spoken utterance is received while the user is handling the portable computing device. In some implementations, causing the camera to capture the image data is performed without the user, subsequent to providing the spoken utterance, directly contacting any programmable touch interface of the computing device.

In other implementations, a method implemented by one or more processors is set forth as including operations such as receiving, at a computing device, an input from a user, wherein the computing device provides access to an automated assistant and a camera. The method can further include an operation of determining, based on the input, that the input is a request for the automated assistant to operate the camera according to one or more conditions. In some implementations, the one or more conditions are specified in natural language content of the input. The method can further include an operation of accessing, based on the one or more conditions, one or more trained machine learning models, wherein the automated assistant accesses the one or more trained machine learning models to assist with identifying one or more features of an environment of the computing device or another computing device. The method can further include an operation of processing, using the one or more trained machine learning models, data that characterizes one or more current features of the environment of the computing device or another computing device. The method can further include an operation of determining, based on the data, whether the one or more current features of the environment satisfy the one or more conditions, wherein the one or more conditions are satisfied when the environment of the computing device or the other computing device exhibits one or more specified features. The method can further include an operation of, when the one or more conditions are determined to be satisfied: causing the camera to capture image data.

In some implementations, a condition of the one or more conditions is satisfied when a current feature of the environment exhibits a particular property, and wherein processing the data that characterizes the one or more current features includes: assigning a confidence score for a property of the current feature of the environment, wherein the condition is satisfied when the confidence score satisfies a threshold score. In some implementations, determining that the input is the request for the automated assistant to operate the camera according to the one or more conditions includes: biasing, based on the current feature of the environment, a natural language understanding of the input. In some implementations, the method can further include an operation of determining that the input, or another input, includes another request for the automated assistant to cause the image data to be modified; and when the one or more conditions are determined to be satisfied: causing the image data that is captured by the camera to be modified according to the input or the other input. In some implementations, the other request is embodied in the other input provided by the user, and the other input is received when the camera is capturing the image data. In some implementations, causing the camera to capture the image data is performed without the user directly contacting a touch interface of the computing device to start capturing the image data.

In yet other implementations, a method implemented by one or more processors is set forth as including operations such as receiving, by a computing device, a spoken utterance from a user, wherein the computing device provides access to an automated assistant and a camera. The method can further include an operation of determining, based on the spoken utterance, that the spoken utterance includes a request for the automated assistant to control the camera, wherein the spoken utterance specifies one or more conditions that, when satisfied, causes the automated assistant to initialize performance of an operation that utilizes the camera. The method can further include an operation of processing, based on the one or more conditions, image data that is generated using the camera in furtherance of determining whether the one or more conditions are satisfied. The method can further include an operation of, when the one or more conditions are determined to be satisfied: causing the automated assistant to initialize performance of the operation using the camera, wherein initializing the operation causes the camera to capture additional image data.

In some implementations, the additional image data includes video data, and causing the automated assistant to initialize performance of the operation using the camera includes: causing the camera to capture the video data for a period of time in which the one or more conditions are satisfied. In some implementations, the method can further include an operation of identifying, based on the one or more conditions, one or more trained machine learning models, wherein processing the image data is performed using the one or more trained machine learning models, and wherein the one or more trained machine learning models are trained using training data that characterizes environmental features that satisfy the one or more conditions. In some implementations, the method can further include an operation of subsequent to determining that the one or more conditions are satisfied: processing separate image data in furtherance of determining whether the one or more conditions are no longer satisfied, wherein the separate image data is captured using the camera. In some implementations, the method can further include an operation of, subsequent to determining that the one or more conditions are satisfied: determining that the one or more conditions are no longer satisfied, and causing, based on the one or more conditions no longer being satisfied, the computing device to store the additional image data and at least a portion of the separate image data as an image file. In some implementations, causing the automated assistant to initialize performance of the operation using the camera is performed without the user directly contacting a touch interface of the computing device to start capturing the additional image data or stop capturing the additional image data.

We claim:
1. A computing device, comprising:
    a microphone;
    a camera;
    memory storing instructions;

one or more processors operable to execute the instructions to:

receive, via the microphone, a spoken utterance from a user;

determine, based on the spoken utterance:

that the spoken utterance includes a request to control the camera, and that the spoken utterance specifies one or more audible conditions that, when satisfied, cause automatically initializing performance of an operation that utilizes the camera;

process, in response to determining that the spoken utterance specifies the one or more audible conditions, audio data that is generated using the microphone and that is stored temporarily in memory;

determine, based on processing the audio data, that the one or more audible conditions are satisfied by the audio data; and responsive to determining that the one or more audible conditions are satisfied:

initialize, automatically, performance of the operation using the camera.

2. The computing device of claim 1, wherein in initializing, automatically, performance of the operation using the camera, one or more of the processors are to cause the camera to capture image data.

3. The computing device of claim 2, wherein the image data is video data.

4. The computing device of claim 2, wherein in initializing performance of the operation using the camera one or more of the processors are to:

modify, based on natural language content of the spoken utterance, one or more settings of the camera, wherein the image data is captured when the camera is operating according to the one or more settings as modified.

5. The computing device of claim 1, wherein one or more of the processors are further operable to execute the instructions to:

subsequent to determining that the one or more audible conditions are satisfied:

process further audio data in furtherance of determining whether the one or more audible conditions are no longer satisfied, wherein the further audio data is captured using the microphone.

6. The computing device of claim 1, wherein one or more of the processors are further operable to execute the instructions to:

subsequent to determining that the one or more audible conditions are satisfied:

determine, based on processing the further audio data, that the one or more audible conditions are no longer satisfied; and cease performance of the operation in response to determining that the one or more audible conditions are no longer satisfied.

7. The computing device of claim 6, wherein one or more of the processors are further operable to execute the instructions to:

subsequent to determining that the one or more audible conditions are satisfied:

determine, based on processing the further audio data, that the one or more audible conditions are no longer satisfied; and cease performance of the operation in response to determining that the one or more audible conditions are no longer satisfied.

8. The computing device of claim 1, wherein the computing device is a portable computing device and the spoken utterance is received while the user is handling the portable computing device.

9. A computing device, comprising:

a microphone;

a camera;

memory storing instructions;

one or more processors operable to execute the instructions to:

receive, via the microphone, a spoken utterance from a user;

determine, based on processing the spoken utterance:

that the spoken utterance includes a request to control the camera, and that the spoken utterance specifies a combination of at least a first condition and a second condition that, when satisfied, cause automatically initializing performance of an operation that utilizes the camera, wherein the first condition and the second condition occur subsequent to the spoken utterance;

process, based on the spoken utterance, data generated by the computing device;

determine, based on processing the data, that the first condition and the second condition are satisfied; and responsive to determining that the first condition and the second condition are satisfied:

initialize, automatically, performance of the operation using the camera.

10. The computing device of claim 9, wherein one or more of the processors are further operable to execute the instructions to:

subsequent to determining that the first condition and the second condition are satisfied:

process further data, generated by the computing device, in furtherance of determining whether the first condition and/or the second condition are still satisfied.

11. The computing device of claim 10, wherein one or more of the processors are further operable to execute the instructions to:

determine, based on processing the further data, that the first condition and/or the second condition are no longer satisfied; and cause, based on determining that the first condition and/or the second condition are no longer satisfied, ceasing performance of the operation.

12. The computing device of claim 9, wherein one or more of the processors are further operable to execute the instructions to:

identify, based on the first condition, a first trained machine learning model;

wherein in processing the data one or more of the processors are to process the data using the first trained machine learning model in response to identifying the first trained machine learning model based on the first condition.

13. The computing device of claim 12, wherein in identifying the first trained machine learning model one or more of the processors are to identify the first trained machine learning model based on the first trained machine learning model being trained using training data that characterizes environmental features that satisfy the first condition.

14. The computing device of claim 12, wherein one or more of the processors are further operable to execute the instructions to:

identify, based on the second condition, a second trained machine learning model;

wherein in processing the data one or more of the processors are to process the data using the second trained machine learning model in response to identifying the second trained machine learning model based on the second condition.

15. The computing device of claim 9, wherein in determining that the spoken utterance specifies the combination of the first condition and the second condition one or more of the processors are to:

bias speech recognition processing of audio data, corresponding to the spoken utterance, based on one or more objects that are present in current image data captured by the camera during the spoken utterance.

16. The computing device of claim 9, wherein in initializing performance of the operation using the camera one or more of the processors are to:

modify, based on the first condition and/or the second condition, one or more settings of the camera, wherein media data is captured when the camera is operating according to the one or more settings as modified.

17. The computing device of claim 9, wherein the first condition and the second condition are each a respective feature of a current operating environment of the computing device.

18. The computing device of claim 9, wherein the first condition and the second condition are each a respective feature of an application currently operating on the computing device or another computing device.

* * * * *